(12) United States Patent
Battlogg et al.

(10) Patent No.: US 7,677,370 B2
(45) Date of Patent: Mar. 16, 2010

(54) ENERGY ABSORBING DEVICE

(75) Inventors: Stefan Battlogg, St. Anton/Montafon (AT); Jürgen Pösel, Bludenz (AT)

(73) Assignee: Inventus Engineering GmbH, St. Anton/Montafon (AT)

( * ) Notice: Subject to any disclaimer, the term of this patent is extended or adjusted under 35 U.S.C. 154(b) by 0 days.

(21) Appl. No.: 12/137,972

(22) Filed: Jun. 12, 2008

(65) Prior Publication Data
US 2008/0245629 A1 Oct. 9, 2008

Related U.S. Application Data

(63) Continuation of application No. PCT/EP2006/011927, filed on Dec. 12, 2006.

(30) Foreign Application Priority Data

Dec. 12, 2005 (EP) .................................. 05027133

(51) Int. Cl.
F16F 9/53 (2006.01)
(52) U.S. Cl. .................... 188/267.2; 280/775
(58) Field of Classification Search ................. 280/775, 280/777; 188/267, 267.1, 266.1, 371, 267.2
See application file for complete search history.

(56) References Cited

U.S. PATENT DOCUMENTS

| 3,656,366 A | 4/1972 | Somero |
| 4,019,403 A | 4/1977 | Kondo et al. |
| 4,255,986 A | 3/1981 | Mukoyama |
| 5,419,581 A * | 5/1995 | Schafer et al. ............... 280/775 |
| 5,449,199 A * | 9/1995 | Heinrichs et al. ............ 280/775 |
| 5,788,278 A * | 8/1998 | Thomas et al. ............... 280/777 |
| 5,870,930 A | 2/1999 | Willett et al. |
| 6,203,105 B1 | 3/2001 | Rhodes, Jr. |
| 6,234,528 B1 | 5/2001 | Ben-Rhouma et al. |
| 6,279,952 B1 | 8/2001 | Van Wynsberghe et al. |
| 6,296,280 B1 * | 10/2001 | Struble et al. ................ 280/777 |
| 6,437,687 B2 | 8/2002 | Spencer |
| 6,514,001 B1 * | 2/2003 | Yezersky et al. .......... 403/109.1 |
| 6,641,167 B2 | 11/2003 | Riefe et al. |
| 6,749,045 B2 | 6/2004 | Rosenfeldt et al. |
| 6,824,211 B2 | 11/2004 | Bayer et al. |

(Continued)

FOREIGN PATENT DOCUMENTS

DE 19820570 A1 11/1999

(Continued)

OTHER PUBLICATIONS

International Search Report dated Apr. 17, 2007.

(Continued)

*Primary Examiner*—Melanie Torres
(74) *Attorney, Agent, or Firm*—Laurence A. Greenberg; Werner H. Stemer; Ralph E. Locher

(57) ABSTRACT

An energy absorbing device, particularly for single-use occupant protection in vehicles on the action of an external force, has a free-flowing medium which is forced through a constriction by a mobile pressure element on the action of an external force. A pull device or tension device pulls on the pressure element on the action of the external force.

30 Claims, 5 Drawing Sheets

U.S. PATENT DOCUMENTS

| | | |
|---|---|---|
| 7,165,786 B1 | 1/2007 | Sha et al. |
| 7,264,271 B2 | 9/2007 | Barvosa-Carter et al. |
| 7,380,804 B2 | 6/2008 | Lee |
| 2002/0047295 A1 | 4/2002 | Sullivan et al. |
| 2003/0026728 A1 | 2/2003 | Avram |
| 2003/0102658 A1 | 6/2003 | McCarthy et al. |
| 2004/0173422 A1 | 9/2004 | Deshmukh et al. |

FOREIGN PATENT DOCUMENTS

| | | |
|---|---|---|
| DE | 10001420 A1 | 7/2001 |
| EP | 0925997 A2 | 6/1999 |
| EP | 1060974 A1 | 12/2000 |
| EP | 1176049 A3 | 1/2004 |
| JP | 11348792 A | 12/1999 |
| WO | 9958873 A1 | 11/1999 |
| WO | 0029264 A1 | 5/2000 |
| WO | 0037298 A1 | 6/2000 |
| WO | 0192071 A1 | 12/2001 |
| WO | 03033328 A3 | 4/2003 |

OTHER PUBLICATIONS

International Search Report dated Mar. 27, 2007.
European Search Report dated May 29, 2006.

* cited by examiner

ENERGY ABSORBING DEVICE

CROSS-REFERENCE TO RELATED APPLICATION

This is a continuation, under 35 U.S.C. § 120, of copending international application No. PCT/EP2006/011927, filed Dec. 12, 2006, which designated the United States; this application also claims the priority, under 35 U.S.C. § 119, of European patent application No. 05 027 133.7, filed Dec. 12, 2005; the prior applications are herewith incorporated by reference in their entirety.

BACKGROUND OF THE INVENTION

Field of the Invention

The invention relates to an energy absorbing device, in particular for occupant protection in a vehicle in the event of the action of external force, with a flowable medium which is pressed by a movable pressure element through a constriction as a result of the action of external force, in particular as a result of an impact.

A device of this general type is described, for example, in German published patent application DE 100 01 420 and its counterpart U.S. Pat. No. 6,749,045. There, there is shown an element of the type of a shock damper, in which an electro-rheological fluid contained in a cylinder is pressed by a conventional piston through an annular gap, the outer and inner boundary surfaces of which are designed as an electrode surface. A change in the electrical field which can be applied influences the viscosity of the fluid and the flow resistance of the annular gap. Instead of an electro-rheological fluid, a magneto-rheological fluid may also be used. However, there is not information and details provided as to the completely different design of the shock damper which is then necessary.

In applications with magneto-rheological fluids, in general, the distinction may be made between low-pressure and high-pressure systems. Shock dampers, seat dampers, fitness appliances, etc. are low-pressure systems, upon the repeated action of which an internal pressure in the magneto-rheological fluid of no more than approximately 50 bar is to be built up in a piston/cylinder system or the like. The low pressures are achieved by means of the ratio between cylinder diameter and piston diameter, and, because of the coil in the piston, larger piston diameters are required. In devices absorbing impact energy, the situation is different, since these are not used repeatedly. Sealing problems likewise do not arise here. Pressures in the range of 50 bar to approximately 200 bar occur, thus greatly reducing the necessary volume of the costly magneto-rheological fluid.

An energy absorbing device installed in the steering column of a motor vehicle is described, for example, in U.S. Pat. No. 5,870,930. The steering column has parts capable of being pushed telescopically one into the other, one part being provided with a ring-shaped container, into which a suitable fluid, for example a flowable silicone, is introduced. The second part has fixed to it a sleeve which penetrates in a manner of a piston into the container and, in the event of an impact, presses out the fluid through a crown of small orifices. The orifices are covered by an annular burst element.

International PCT publication WO 00/37298 and its counterpart U.S. Pat. No. 7,165,786 also describe, inter alia, an adjustable steering column with a locking device having two cylinders which are connected by means of a taper and which are filled with magneto-rheological fluid. The taper is assigned a permanent magnet, if appropriate also an electro-magnet, which blocks the throughflow of the medium as soon as the steering column is fixed in the desired position. A piston rod passing through the taper carries the two pistons at a fixed spacing, and, on the one hand, the projecting end of the piston rod and, on the other hand, the housing of the second cylinder are fastened to the two displaceable parts of the steering column.

Devices absorbing impact energy are advantageous or necessary in vehicles not only on the steering column, but also on a series of other components, for example on head supports, safety belts, seats and seat elements, etc. In an extreme case, more than 20 different installation locations can be found in a motor vehicle.

Collision-relevant components on safety belts, airbags, etc. can at the present time be triggered mostly in a single stage, at most in two stages. Multistage triggering is extremely complicated, and variable triggering has hitherto been impossible.

For example, the steering column should absorb a large part of the impact energy of the driver, that is to say be of rigid design, and the counterforce should amount to approximately 8000 N. If the driver is strapped in and of light weight, a counterforce of 2000 N is sufficient. In the case of drivers of light weight who are strapped in, the much too high counterforce of 8000 N may lead to serious to fatal injuries. However, if the steering counterforce is set at 2000 N, a driver not strapped in would decelerate too slowly and be pressed with high residual energy up to the limit stop of the steering column displacement. Since this, too, results in serious injuries, attempts were made to optimize the airbag and the safety belt, so that this combination absorbs the largest part of the impact energy of the driver and leaves only insignificant residual energy for the steering column, so that a low counterforce is sufficient. However, this does not solve the problem of variable adaption, but merely changes its emphasis.

This is a disadvantage with regard to the deceleration values of the driver's body, since valuable travel is wasted. The impact can be subdivided into two travel stages, to be precise into a first deceleration travel during the airbag and belt functioning, which amounts on average to about 40 cm, and into a subsequent second deceleration travel during the steering column deformation, which amounts to about 10 cm. The body therefore has to be sharply decelerated in the first deceleration travel, so that the residual energy at the transfer to the second deceleration travel is low. Deceleration is inversely proportional to the travel, that is to say the short second deceleration travel means a high deceleration. However, since only low counterforces are to be available in the second travel so as not to put drivers of light weight at risk, a high deceleration is allowed for in the first travel, so that, during the first travel, the body is subjected to high load and, in the case of small persons of light weight, to excessively high load. The specified average travel stage of 40 cm for the first deceleration travel refers to a driver of medium size. As regards small persons who sit appreciably nearer to the steering wheel, the first deceleration travel is substantially shorter and is about 25 cm. The fraction of the second deceleration travel in the overall deceleration travel therefore increases to about one third, without the counterforce set in terms of drivers of light weight being capable of being varied. The deceleration, rated in terms of heavy persons, in the first deceleration travel must therefore become even greater and is sometimes even such that the body is flung back. In many vehicles, therefore, the airbag can be switched off for lightweight and small drivers, but in this case the steering assumes the increased counterforce function. It is expedient and effective to utilize the overall travel (approximately 50 cm overall) and always to decelerate appropriately over the sum of the travel stages.

This alone leads to lower loads on the body and is possible only by means of a regulatable system.

In modern motor vehicles, there is basically a lack of construction space, since as much space as possible has to be left for the rated load to be transported. In the case of steering columns, too, it is necessary above all, not to increase the length, that is to say the extent in the direction of the column, by installing an energy absorbing device. Since the piston functions as a pressure element, the piston/cylinder systems described are provided with a piston rod guided in the cylinder, guidance taking place in a region of the cylinder which lies outside, that is to say on the far side of, the reception space for the medium contained. On account of the action of pressure, a sturdy type of construction is required, since neither the piston rod should buckle nor the piston should tilt in the cylinder.

SUMMARY OF THE INVENTION

It is accordingly an object of the invention to provide an energy absorbing element, which overcomes the above-mentioned disadvantages of the heretofore-known devices and methods of this general type and which is as short as possible.

With the foregoing and other objects in view there is provided, in accordance with the invention, an energy absorbing device for absorbing an external force, comprising:

a movable pressure element;

a flowable medium to be pressed through a constriction by said movable pressure element as a result of an action of the external force; and a pull device configured to pull on said pressure element in an event of the action of external force.

In other words, the objects of the invention are achieved by way of a pull device which pulls on the pressure element in the event of an action of external force.

Thus, the cylinder, designated below as a container, can be shortened by the amount of that region which lies outside the filling space and which is required for guiding the piston rod. The length saving is restricted to that amount which, in the systems initially mentioned, is necessary for avoiding buckling and tilting when the piston rod is pulled through the filling space of the container, and in many instances this may be sufficient to make it possible to install a device of this type.

However, an appreciably greater length saving may be achieved if the pull device comprises a deflectable pull element and at least one deflection body, since a version of this type has no growing push-out length. The deflected pull element can in this case not only be retracted parallel to the container, but also in different directions, depending on the design of the component to be decelerated in its movement on account of the action of external force. The deflectable pull element is preferably a rope or a flat band, and the latter, above all, can be manufactured from a material which, during the deflection, offers a deformation resistance, to overcome which additionally absorbs energy.

Particularly in the case of steering columns, a preferred version can advantageously be installed in which the first end of the deflectable pull element is connected to the pressure element and the second end is held fixedly, and in which the deflection body is arranged displaceably together with the device.

Between the pull element and the deflection body, there may be relatively higher friction, to overcome which additionally absorbs energy. Alternatively, however, a version is expedient in which the deflection body is a deflection roller, since the rotation of the deflection roller can also be braked during the breakdown of the action of external force. Above all, however, the rotating deflection roller may form part of a simple gear if, for example, the pull element is composed of two portions, of which one, coming from the pressure element, is wound onto the deflection roller forming a reel having a first diameter, while the second portion, the second end of which is held fixedly, is unwound from a coaxial second reel having, in particular, a larger diameter.

The flowable medium contained in the device is pressed out of the container through a constriction, in particular on the container bottom lying opposite the pressure element. Preferably, therefore, the pull element is also led through the constriction out of the container, although this is not absolutely necessary, since versions may also be envisaged in which the pressure element has knife-like extension which project diametrically through the container wall and on which a pull is exerted and which at the same time slit the container. Designs of this type may readily be used for devices in which the action of external force takes place as a result of an impact caused by an accident, since the destruction of the device may be allowed for, and the slitting of the container wall likewise absorbs energy.

A device of the type initially mentioned, to be used once only, is provided, in particular, with a controllable energy absorber, in which energy absorption can not only be set variably as a function of the vehicle deceleration, the impact angle, the driver's mass, etc., but can also be varied during the impact, the medium being magneto-rheological and the constriction being assigned a device for generating an, in particular, variable magnetic field.

This can preferably be achieved in a version in which the constriction comprises an outlet duct which surrounds the device. The impact time is naturally very short and, according to the EuroNCAP test (European New Car Assessment Programme), is, in particular, between 30 and 100 milliseconds. The length of the outlet duct is in this case dimensioned such that the dwell time in which each magnetizable particle in the medium is located in the magnetic field is sufficiently long to ensure that all the particles can be oriented completely. This time is at least one millisecond. The length of the outlet duct is calculated from the formula:

$$L \geq \frac{V_m \cdot t_v}{(t_a - t_v) \cdot F} \text{ or } L \geq \frac{X \cdot Y \cdot Z \cdot t_v}{(t_a - t_v) \cdot B \cdot H},$$

in which $V_m$ is the volume of the medium in the container, where

X is the width of the receptacle space of the container,

Y is the height of the receptacle space of the container, and

Z is the length of the receptacle space of the container, $t_v$ is the dwell time, $t_a$ is the impact time, and F is the cross-sectional area of the outlet duct where B is the width of the outlet duct, and H is the height of the outlet duct.

Since the minimum dwell time amounts to about 1% to 1.2% of the impact time, it can even be ignored in an approximate calculation, with the result that the calculated length of the outlet duct increases by about 1% to 2%. As is clear, a longer dwell time has a direct effect on the length of the outlet duct; in many instances, however, the available installation space allows only the minimum length.

There are various possibilities afforded for influencing the flow resistance of the constriction. On the one hand, it is conceivable to change the cross section, for example by subdivision into a plurality of ducts which can be shut off individually, by means of adjustable slides, diaphragms, etc. or by means of at least one valve having a plurality of opening positions.

Further, it is possible to vary the outlet quantity per unit time, for example by means of containers having a cross-sectional area variable over the length, so that the pressed-out quantity fluctuates per unit travel or per unit time.

Since relatively little energy for building up or for changing the field has to be supplied to magneto-rheological fluids, in a preferred version, the flow resistance of the constriction can be regulated by means of a variable magnetic field. In this case, the flowability of the magneto-rheological medium is influenced, while energy absorption can be adapted to different initial states and conditions, and neither seals nor mechanically movable parts are necessary. This is particularly important for functioning in an emergency, since impact damping devices are in most instances not employed at all, and therefore their functioning capacity cannot be tested regularly.

In a piston/cylinder system, the pressure surface of the piston should not be too small, since the pressure otherwise becomes too high. If 200 bar pressure, that is to say 20 N/mm² surface pressure, is not to be overshot, then, with an impact force of 8000 N, a pressure surface of 4 cm², corresponding to a piston diameter of about 2.25 cm, is required. The larger the piston diameter is, the lower is the pressure in the cylinder, this being advantageous, but the larger is the displaced liquid quantity, which is a disadvantage, the volume being calculated from the pressure surface of 4 cm², multiplied by a stroke corresponding to the steering column deformation, that is to say approximately 10 cm, and, in this example, amounting to 40 cm³, that is to say 40 ml. The pressure surface and the traveling speed of the piston, which is derived from the deformation speed upon impact (up to 5 m/s), yield the volume flow, a resulting volume per unit time to be magnetized and a specific cross-sectional area of the constriction.

The constriction has an inlet orifice which is preferably rectangular and is delimited by the side walls of the container, the side walls which form longer rectangle sides converging toward the orifice, so that a narrow slit is formed. The following outlet duct preferably has the same cross section and is led through the gap between two iron parts, forming two magnetic poles, of the device generating the magnetic field. In order to keep the distance between the two poles short—the gap height should be less than 5 mm, the two wide walls of the outlet duct may be interrupted in the region of the iron parts, so that the medium comes directly into contact with the pole faces. Since the cross-sectional area should not be reduced, however, a reduction in the gap height leads to a widening of the outlet duct. Gap heights which are practicable in structural terms are therefore between 1 mm and 3 mm. A version which is as optimal as possible in this case provides for the cross-sectional area of the outlet duct to amount to at least 10% of the cross-sectional area of the container.

The two iron parts may be permanently magnetic, while their magnetic field may be intensified or attenuated, if appropriate even deactivated, by means of the magnetic field of an activatable coil.

In another version, the two iron parts may be magnetizable via an activatable coil in order to increase the flow resistance from a lower limit value. This limit value may depend, for example, on the viscosity of the unmagnetized medium and on a bursting element which, where appropriate, covers the orifice around the pull element and which releases the orifice in the case of a specific pressure of the medium.

For current supply, in particular, a condenser is provided; however, another suitable current source, for example an accumulator, may also be envisaged, if it is available at the place of use.

The magnetic field must in this case act magnetically upon the entire outlet duct in length, but not in width. For example, the magnetic field could also be provided only in the two edge regions, so that the pull element can easily be led through the middle part of the outlet duct.

Further, the outlet duct may also be supplemented in the magnetic field by a bypass duct which can be connected or disconnected. The counterforce range can consequently be increased. The bypass could also go "into the open", this being advantageous in the case of very high forces since the range of adjustment is increased.

Other features which are considered as characteristic for the invention are set forth in the appended claims.

Although the invention is illustrated and described herein as embodied in energy absorbing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
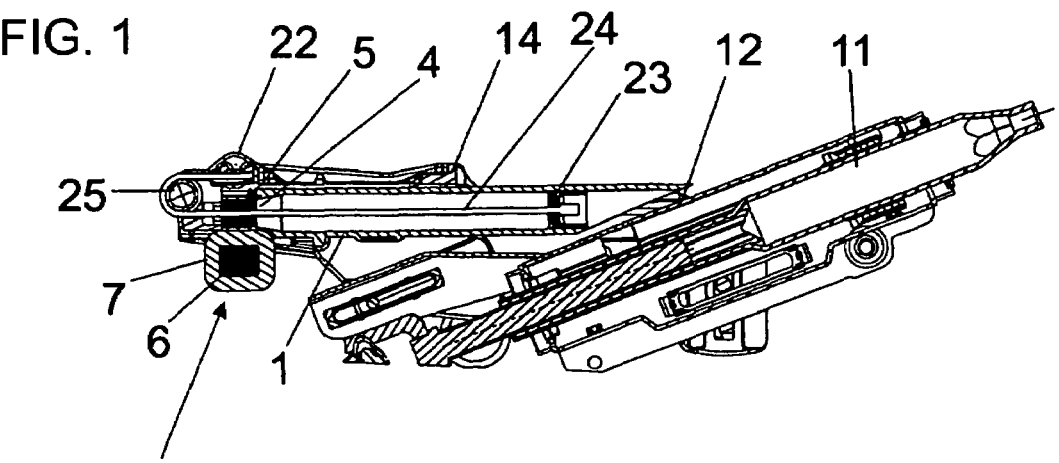
FIG. 1 shows a diagrammatic detail of a steering column with a device according to the invention.

Referring now to the figures of the drawing in detail and first, particularly, to FIG. 1 thereof, an energy absorbing device according to the invention may be assigned, for example, to a steering column 11. The device has a container 1, the volume of which can be reduced by means of a movable pressure element 23 and in which, in particular, a magneto-rheological fluid is contained. The container 1 is fixed to a part 12 of the steering column 11 which is displaceable with respect to a location-fixed or vehicle-fixed part 14. In the event of an impact, the steering column 11 can be displaced or shortened, and the fluid contained in the container 1 is pressed out by the pressure element 23 through a constriction 4 and its outlet duct 5, the flow resistance of the constriction 4 delaying the pressing out of the fluid, so that impact energy is absorbed. The outlet duct 5 is surrounded by a device 2 for generating a variable magnetic field. The device 2 comprises an electromagnet 6, 7, via which a magnetic field is generated or the magnetic field of a permanent magnet is influenced. The electromagnet 6, 7 can be activated via signals from sensors, which monitor an impact, as a function of various criteria, such as the weight and sitting position of the driver, etc., the variable magnetic field varying the viscosity of the fluid to be pressed through the constriction, and the counterforce becoming higher or lower.

The device has a pull device which pulls on the pressure element 23 in the event of the action of external force. For this purpose (see also FIG. 9), the pull device is provided with a rope-like or band-like pull element 24, the first end of which is fastened to the pressure element 23. The pull element 24 passes centrally through the outlet duct 5 and is led via a deflection body 25 to a location-fixed, that is to say body-fixed, tie-up point 22 for the second end of the pull element 24. The deflection body 25 is oriented at the front end of the container 1 and therefore moves together with the container 1 when the steering column 11 is displaced or shortened in the event of the action of external force. The deflection body 25 moves away from the tie-up point 22 on the vehicle-fixed part 14, and the fixed pull element 24 pulls the pressure element 23 up to the constriction 4, as is evident from FIGS. 2 and 3. The traveling speed of the pressure element 23 in the container 1 is in this case twice as high as the traveling speed of the container itself, in each case with respect to the vehicle-fixed part 14.

Figure 2:
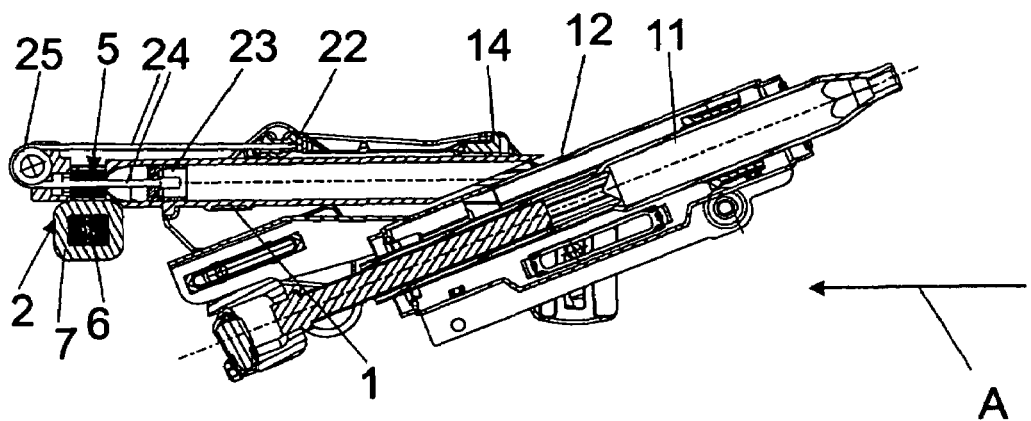
FIG. 2 shows a section according to FIG. 1, the steering column being displaced in parallel in the direction of the arrow A as a result of the impact.
Figure 3:
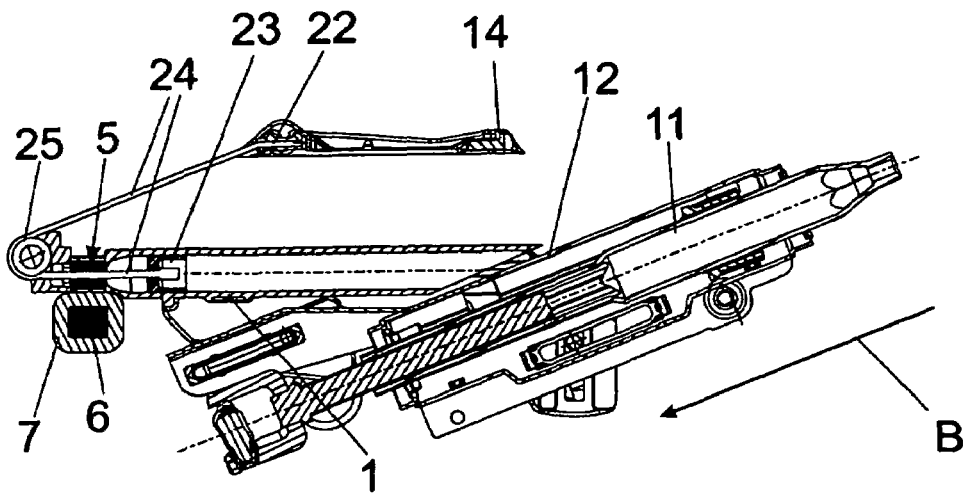
FIG. 3 shows a section according to FIG. 1, the steering column being displaced axially in the direction of the arrow B as a result of the impact.

Depending on the design of the steering, in the event of the action of external force, in particular an impact or collision, the steering column 11 can be displaced in the direction of the arrow A, as shown in FIG. 2, or be shifted in the direction of the arrow B, as shown in FIG. 3. According to FIG. 2, the pull element 24 remains deflected through 180° and is returned, parallel to the container 1, to the tie-up point 22, as illustrated in FIG. 2. In the event of the shortening of the steering column 11 according to FIG. 3, the portion returned to the tie-up point 22 is displaced obliquely.

A comparison of FIGS. 2 and 3 shows clearly that, on a count of the deflection of a deflectable pull element 24, the tie-up point 22 may be provided at virtually any desired point around the energy absorbing device, and that the front free space required for the displacement of the container is very small. Further, a forward push of the container solely in the event of a collision or impact also means that the device can be mounted in its shortest possible length, and any damage to vehicle elements in front of the container in the event of an impact is generally unimportant, if parts of the vehicle are damaged in any case. The use of a pull element 24 for moving the pressure element 23 reduces the risk of the tilting of the pressure element 23 in the container 1, since the distance between the guide regions of the container wall and of the outlet duct 5 decreases from a maximum size, in contrast to a piston rod guided on the other sides. Further, the pull device may also be assigned a pull sensor, not shown.

Figure 11:
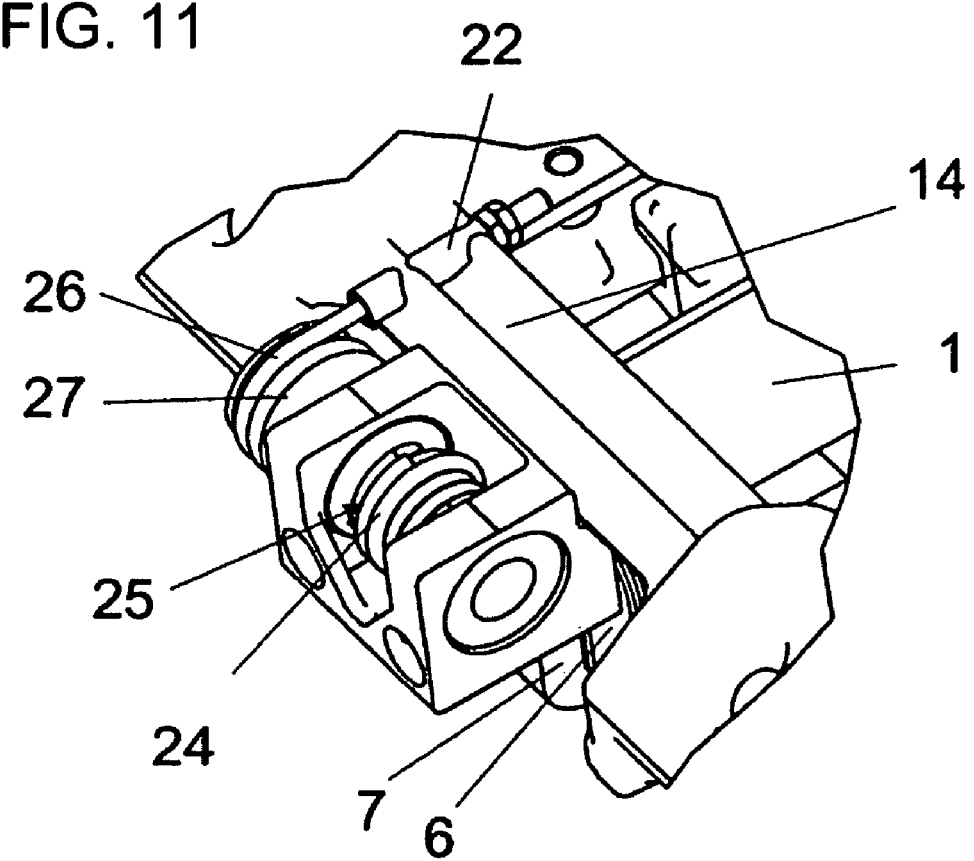
FIG. 11 shows, enlarged, a detail of a second version of a device according to the invention assigned to a steering column.
Figure 12:
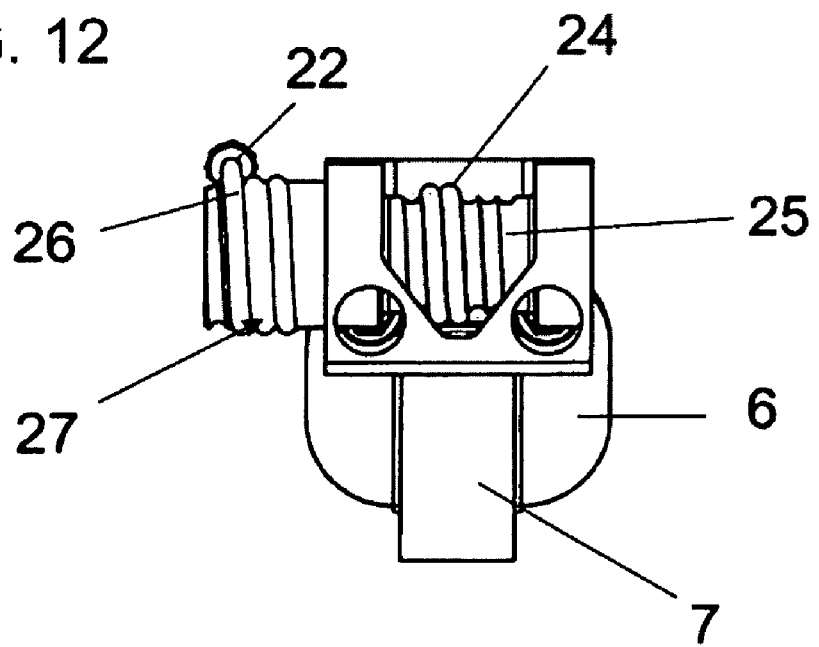
FIG. 12 shows an end view of the deflection body of FIG. 11.

The deflection body 25 may be a sliding or a rolling body. A sliding body increases the friction and consequently the energy absorption, whereas a rolling body allows the use of a rotary sensor for determining data which can be evaluated in control electronics in order to adapt the magnetic field. A further advantage of a rolling body is shown in FIGS. 11 and 12.

Figure 9:
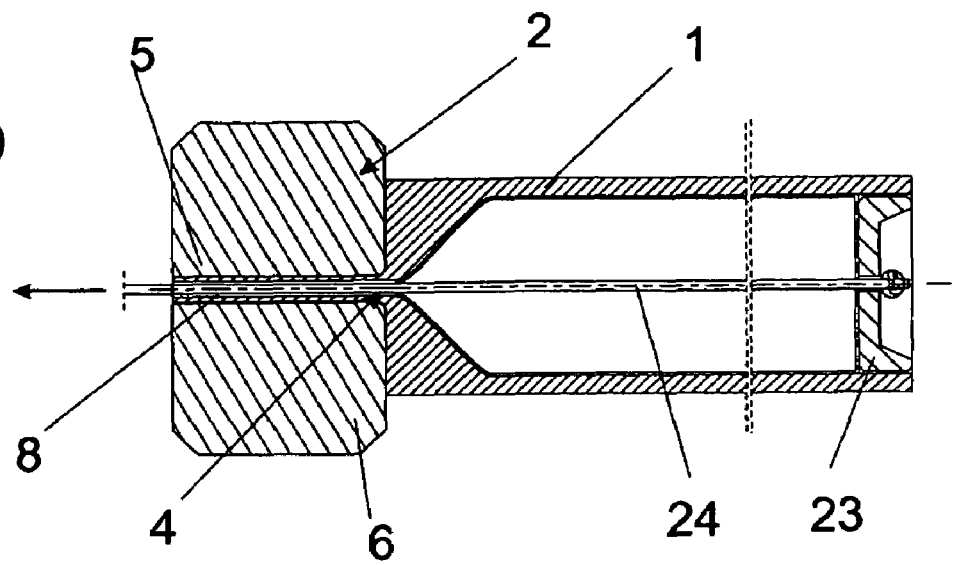
FIG. 9 shows a longitudinal section through a container of the device according to the invention.

Details can be seen more clearly in FIG. 9. The container 1 having any desired cross section tapers toward a rectangular flat orifice at the constriction 4 with its adjoining outlet duct 5 through which the pull element 24 is led. The walls 8 of the outlet duct 5 preferably consist of nonmagnetic material.

Figure 4:
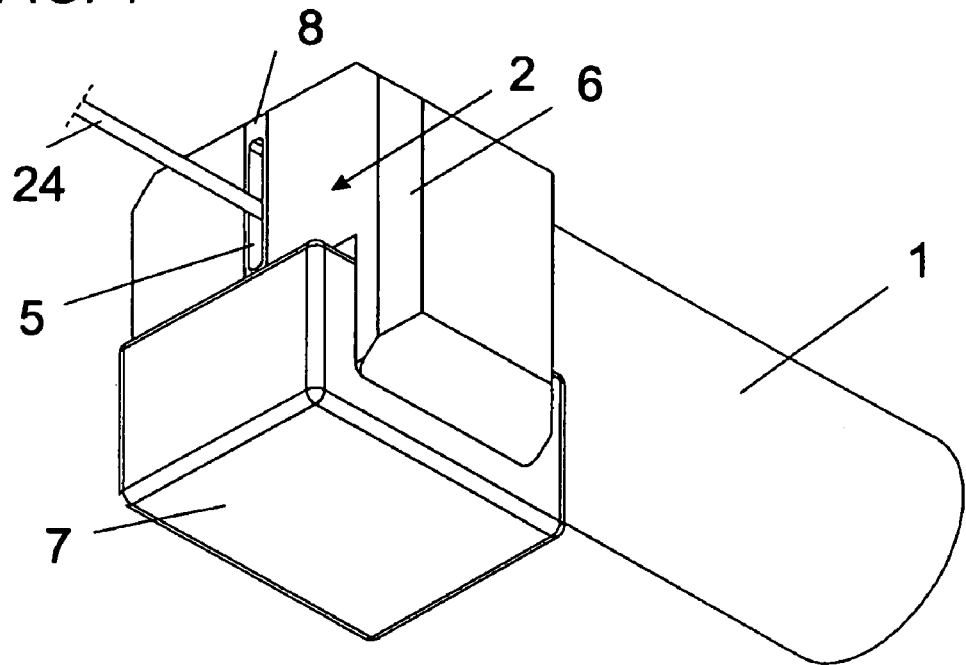
FIG. 4 shows a diagrammatic oblique view of a device according to the invention without a deflection body.
Figure 5:
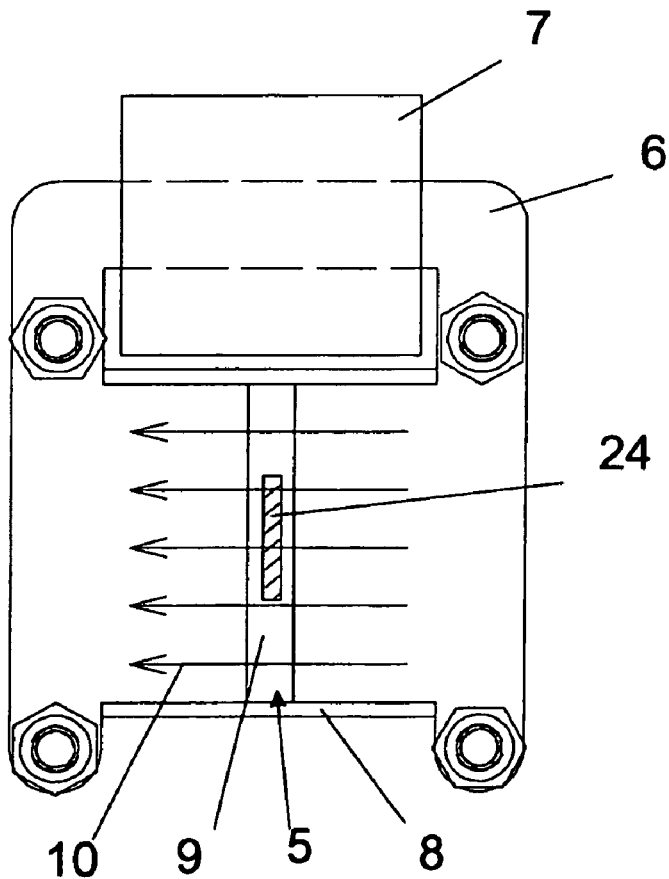
FIG. 5 shows an end view of the device according to FIG. 4 with a magnetic field profile.

FIGS. 4 and 5 show the set-up of the device 2 for generating the variable magnetic field 10 with C-shaped iron elements 6 to which a coil 7 is assigned. The outlet duct 5 passes through the gap 9 between the pole faces of the iron elements 6. As shown in FIG. 4, the two wide walls of the outlet duct may be cut out at the iron elements 6, so that only the narrow walls 8 are present. The gap 9, which has a height of a maximum of 5 mm, preferably of between 1 mm and 3 mm, is minimized as a result, and the magneto-rheological fluid is in direct contact with the pole faces. The pull element 24 passes through the outlet duct 5 approximately centrally.

Figure 6:
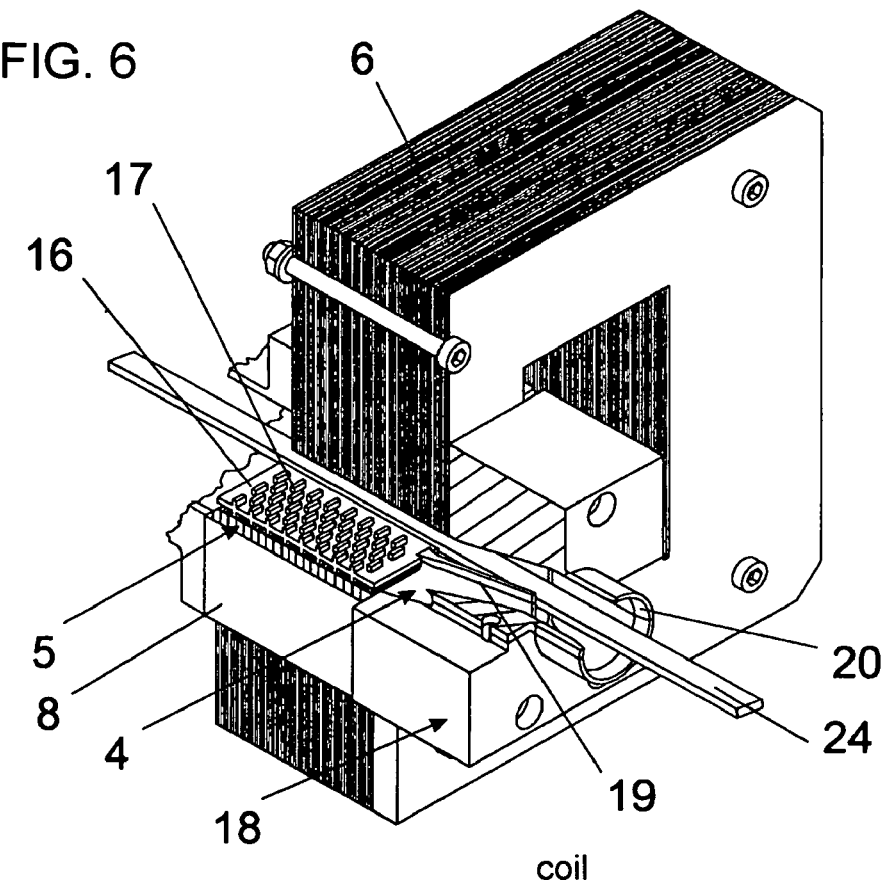
FIG. 6 shows a partial section through a preferred version of the device.

FIG. 6 shows in partial section structural details of a device according to the invention. The outlet duct 5 leading through the iron elements 6 is subdivided by a separating plate 16, from which webs 17 rise on both sides. The dwell time of the medium in the outlet duct 5 is prolonged by the installation parts 16, 17, so that the medium is exposed to the magnetic field for longer, without the electromagnet having to be made larger. The dwell time should amount to at least one millisecond, preferably at least one and a half milliseconds, in order to achieve sufficient magnetization even in the case of force peaks which cause extremely high flow velocities through the outlet duct 5. Further possibilities for prolonging the dwell time are the formation of unevennesses in the boundary walls 8 of the outlet duct 5, end faces, projecting into the gap 9 or set back alternately, of the iron elements 6, or a single or multiple deflection of the overall outlet duct 5, for example in the manner of chicanes. The container orifice issuing into the outlet duct 5 is, in this version, formed on an, in particular, two-part container head 18 which is provided with guide webs 19 for a uniform distribution and introduction of the medium. The container head 18 has a threaded connection piece 20, onto which the container 1 can be screwed by means of a corresponding thread carrying the orifice.

When the magnetic field is initially switched on, the higher flow resistance is added to the inertia forces of the components and to the impact/percussion forces, thus resulting in a high counterforce peak. It is therefore preferable if the magnetic field is switched off until the first load peak has posed and all the components are accelerated. Only thereafter (after approximately 3 ms) should the magnetic field be built up very quickly (in the neighborhood of approximately 10 ms). As a result, the counterforce curve can be adapted even better to the prevailing conditions and can be regulated during the throughflow of the medium through the outlet duct 5, for example in adaptation to a driver's position and/or driver's weight detection, acceleration measurement, and so on.

Figure 7:
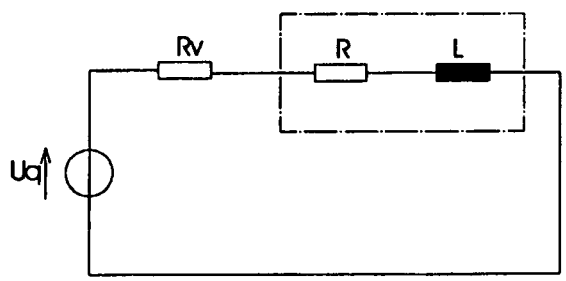
FIGS. 7 and 8 show two circuit diagrams for accelerating the build-up of a magnetic field.
Figure 8:
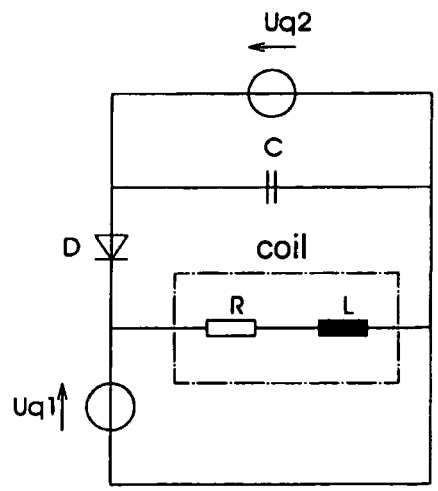

In order to build up the magnetic field quickly, there are, for example, the circuits shown in FIGS. 7 and 8. Since the time constant L/R, after which approximately 63% of the magnetic field is built up, becomes the lower, the higher the resistance R is, according to FIG. 6 the rapid build-up of the magnetic field can be achieved by means of a series resistor Rv which is connected in series with the coil of the device 2 and which is then bridged or switched off.

FIG. 8 shows a possibility in which a condenser C is charged by a separate second voltage source Uq2 and, together with a diode D, transfers an initially high voltage to the coil of the device 2. The short voltage peak amounts to about twice to three times the voltage which is delivered by the first voltage source Uq1 and by means of which the magnetic field is subsequently maintained at the desired size.

The container 1 shown in longitudinal section in FIG. 9 may also be designed in a manner of a concertina and therefore be compressible, the pull element 24 engaging on the bottom of the concertina in order to press out the fluid. If the cross-sectional area of the container is essentially constant over the length, the flow resistance of the constriction 4 is also constant, since the same quantity is pressed through per unit travel or per unit time. If the cross-sectional area of the container changes over the length (uniformly or nonuniformly), increases or is the greatest in the middle, the flow resistance of the constriction 4 also changes in the same way. There is no need for a regulating device at the constriction 4 in order to generate a varying flow resistance, since different impact damping values can already be achieved by means of the appropriate container shape. However, the regulating device 2 at the constriction 4 makes it possible to have a variability of the flow resistance as a function of various criteria.

If an accident occurs, the volume of the container 1 is reduced due to the impact of the upper body on the steering wheel, and the device 2 regulates the throughflow of the medium through the outlet duct 5 by means of a corresponding change in viscosity as a function of signals from a computer which processes various measurement data and parameters.

A condenser accommodated, for example, in the region of the steering wheel is sufficient as a current source, so that the system remains functionable even in the event of a failure of the power supply of the motor vehicle. If the power supply or the electronics fail completely, in any event the flow resistance of the constriction alone, which, for example, has a size of 2000 N, takes effect.

Figure 10:
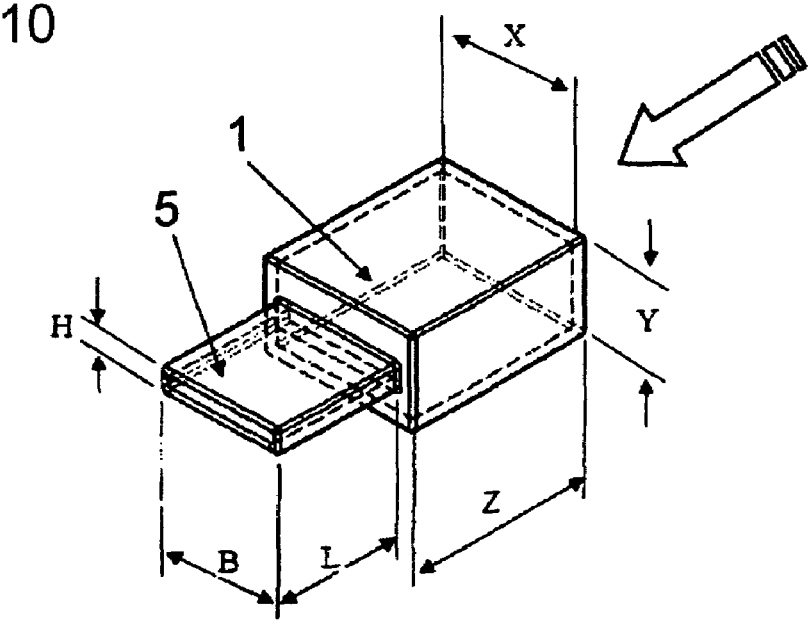
FIG. 10 shows a diagrammatic illustration of the container and of the constriction.

FIG. 10 shows diagrammatically the sizes of the container 1 and of the outlet duct 5 which are used in the above formula for calculating the length L of the outlet duct 5.

FIGS. 11 and 12 show a version in which the deflection body 25 is formed by a first reel on which the pull element 24 can be wound. Coaxially with the first reel is provided a rotationally coupled second reel 27 on which is wound a second portion 26 of the pull element 24, the free end of which is fixed at the body-fixed tie-up point 22. The winding diameters of the two reels are different, so that a step-up or a step-down occurs. The reels may also be arranged symmetrically, that is to say a second reel 27 may be provided on both sides of the first reel.

The device absorbing impact energy, described in the figures, is suitable particularly for installation on steering columns. However, a pulling movement of the pressure element can also be assigned, especially in motor vehicles, to other components, especially since, although the action of external force takes place only from a restricted number of directions—the EuroNCAP test envisages, for example, a front impact and a side impact—, nevertheless deflection is possible in any desired direction, that is to say even downward or upward. An energy absorbing device according to the invention can therefore also be provided, mostly without particular construction space problems, on head supports, safety belts, seats and seat elements, bumper suspensions, etc.

The invention claimed is:

1. An energy absorbing device for absorbing an external force, comprising:
    a movable pressure element;
    a flowable, magneto-rheological medium to be pressed through a constriction by said movable pressure element as a result of an action of the external force; and
    a pull device configured to pull on said pressure element in an event of the action of external force, said pull device including a deflectable pull element extending through said constriction and at least one deflection body;
    a device for generating a magnetic field mounted to be effective at said constriction; and
    a container formed with an orifice issuing into said constriction and having said medium contained therein.

2. The device according to claim 1, wherein said pull element is a rope.

3. The device according to claim 1, wherein said pull element is a band.

4. The device according to claim 1, wherein said pull element is configured to resist a deformation during a deflection via said deflection body.

5. The device according to claim 1, wherein said deflectable pull element has a first end connected to said pressure element and a fixedly held second end, and wherein said deflection body is disposed to be displaceable together with the device.

6. The device according to claim 1, wherein said deflection body is a deflection roller.

7. The device according to claim 1, wherein said device is configured to generate a variable magnetic field in order to influence a flow resistance of said medium through said constriction.

8. The device according to claim 1, wherein said container is a compressible container and said container has a bottom wall opposite said orifice forming said pressure element.

9. The device according to claim 1, wherein said pressure element is formed by a displaceable container bottom.

10. The device according to claim 1, wherein said constriction forms an outlet duct and said device for generating the magnetic field surrounds said outlet duct.

11. The device according to claim 10, wherein said outlet duct has a rectangular cross-sectional area.

12. The device according to claim 10, wherein said outlet duct has walls consisting of nonmagnetic material.

13. The device according to claim 10, wherein said device for generating the magnetic field includes two iron parts forming magnet poles and said outlet duct is led through a gap between said two iron parts.

14. The device according to claim 13, wherein said outlet duct is formed with two wide walls, and said wide walls are interrupted in a region of said iron parts, and said gap corresponds to a height of said outlet duct.

15. The device according to claim 10, wherein said outlet duct has fittings increasing a flow resistance against the medium.

16. The device according to claim 10, wherein a cross-sectional area of said outlet duct amounts to at least 10% of a cross-sectional area of said container.

17. The device according to claim 16, wherein a height of said outlet duct amounts to a maximum of 5 mm.

18. The device according to claim 17, wherein the height of said outlet duct amounts to between 1 mm and 2.5 mm.

19. The device according to claim 10, wherein a length of said outlet duct is defined by the formula:

$$L \geq \frac{V_m \cdot t_v}{(t_a - t_v) \cdot F}$$

where $V_m$ is a volume of said medium in said container,
    $t_v$ is a dwell time,
    $t_a$ is an impact time, and F is a cross-sectional area of said outlet duct.

20. The device according to claim 10, wherein said container is formed with side walls converging toward said constriction.

21. The device according to claim 10, wherein said device for generating the variable magnetic field comprises at least one permanent magnet, and a controllable electromagnet for changing a magnetic field of said permanent magnet.

22. The device according to claim 21, which comprises a capacitor or an accumulator connected to and forming an energy source for said electromagnet.

23. The device according to claim 10, wherein said device for generating the variable magnetic field comprises at least one controllable electromagnet.

24. The device according to claim 23, which comprises a capacitor or an accumulator connected to and forming an energy source for said electromagnet.

25. The device according to claim 1, which further comprises control electronics and at least one sensor.

26. The device according to claim 1, which further comprises a pull sensor assigned to said pull device.

27. The device according to claim 6, which further comprises a rotary sensor assigned to said deflection roller.

28. The device according to claim 1, configured as an impact absorption device for occupant protection in a motor vehicle.

29. A steering column, comprising an energy absorbing device according to claim 1.

30. A method of absorbing energy from an external force acting on a vehicle, which comprises:
 providing a pull device with a deflectable pull element and at least one deflection body;
 pulling a pressure element with the pull device in reaction to the external force, and thereby pressing a flowable, magneto-rheological medium through a constriction with the pressure element; and
 providing a device for generating a magnetic field mounted to be effective at the constriction, and controlling a flow resistance of the constriction against the flowable medium with the device.

* * * * *